(12) United States Patent
Iida

(10) Patent No.: US 7,413,223 B2
(45) Date of Patent: Aug. 19, 2008

(54) HOLOGRAM INSPECTION DEVICE

(75) Inventor: Yoshiaki Iida, Katano (JP)

(73) Assignee: I.C.I. Design Institute Inc., Osaka (JP)

( * ) Notice: Subject to any disclaimer, the term of this patent is extended or adjusted under 35 U.S.C. 154(b) by 217 days.

(21) Appl. No.: 11/359,492

(22) Filed: Feb. 23, 2006

(65) Prior Publication Data

US 2006/0279817 A1 Dec. 14, 2006

(30) Foreign Application Priority Data

Jun. 13, 2005 (JP) ............................. 2005-004347

(51) Int. Cl.
*B42D 15/00* (2006.01)
(52) U.S. Cl. ............................................. 283/85; 359/1
(58) Field of Classification Search ...................... 359/1, 359/2, 831, 833, 834; 283/86, 85; 434/110
See application file for complete search history.

(56) References Cited

U.S. PATENT DOCUMENTS 3,558,207 A 1/1971 Worthington, Jr.
6,535,638 B2 * 3/2003 McGrew ...................... 382/210

FOREIGN PATENT DOCUMENTS

| DE | 101 46 999 A1 | 4/2003 |
| GB | 1 205 224 A | 9/1970 |
| JP | 58-050073 A | 3/1983 |
| JP | 2002-244538 A | 8/2002 |
| JP | 2005-141783 | 6/2005 |
| WO | WO 95/02837 A | 1/1995 |

OTHER PUBLICATIONS

Extended European Search Report dated Oct. 9, 2006, issued in corresponding European Application No. 06115353.2.

* cited by examiner

*Primary Examiner*—Alessandro Amari
(74) *Attorney, Agent, or Firm*—Westerman, Hattori, Daniels & Adrian, LLP.

(57) ABSTRACT

An inspection device in accordance with the present invention is configured so that a light source used for irradiating light, and a reflection-type prism that irradiates the light from the light source to a hologram provided on an inspection target that is placed downward and that diffracts light rays in different directions that are reflected from the hologram upward in the same or substantially the same direction are housed in a case. With such an arrangement, it becomes possible to provide an inspection device that can positively conduct an inspection process for identifying the genuineness of an inspection target having a hologram quickly, and is also advantageous in costs.

3 Claims, 4 Drawing Sheets

HOLOGRAM INSPECTION DEVICE

This application is based on Japanese Utility Model Application No. 2005-4347 filed on Jun. 13, 2005, the contents of which are hereby incorporated by reference.

BACKGROUND OF THE INVENTION

1. Field of the Invention

The present invention relates to an inspection device that carries out an inspection process for identifying the genuineness of an inspection target having a hologram thereon. Such an inspection target having a hologram is typically a banknote. However, the present invention may be applied to any item other than the banknote, such as cards made of paper or plastics, as long as it is provided with a hologram.

2. Description of the Prior Art

An example of a conventional bank-note inspection device is provided with a holding unit that holds a banknote, a light-emitting unit that is attached to the rear face of the holding unit and that irradiates the held banknote with light, and a switching unit that detects the held state of a banknote on the holding unit and allows the light-emitting unit to emit light based upon the result of this detection. This inspection device has an arrangement in which, when a banknote is held by the holding unit, the switching unit detects this and allows the light-emitting unit to automatically emit light, thereby allowing to identify the genuineness of the banknote by visually confirming whether or not a watermark is on the banknote through a sight through unit (for example, see Japanese Patent Application Laid-Open No. 2005-141783).

In recent years, however, counterfeit banknotes with watermarks have been around, with the result that even when the counterfeit banknote is inspected by the above-mentioned conventional banknote inspection device, it tends to be erroneously identified as a real one, making it difficult to practically use this inspection device. New banknotes with holograms have come to be used for this reason. However, in order to confirm the hologram of the new banknotes, a plurality of images need to be confirmed so as to identify the genuineness of the banknote by viewing irregular portions of the hologram with the viewing angle being changed, and it is difficult to immediately direct the banknote in a plurality of predetermined angles so as to be identified, with the result that time-consuming tasks are required in identifying the genuineness of a banknote.

Moreover, in addition to the detection sensor for detecting the held state of the banknote, a switching unit that allows a light-emitting unit to emit light based upon the result of the detection from the detection sensor and the like are required, which could cause an increase in cost.

SUMMARY OF THE INVENTION

An object of the present invention is to provide an inspection device that can positively conduct an inspection process for identifying the genuineness of an inspection target having a hologram quickly, and is also advantageous in costs.

In order to achieve the above-mentioned object, the inspection device in accordance with the present invention is provided with: a light source used for irradiating light; a reflection-type prism that irradiates the light from the light source to a hologram provided on an inspection target that is placed downward, and diffracts light rays in different directions that are reflected from the hologram upward in the same or substantially the same direction; and a case that houses the light source and the reflection-type prism.

With this arrangement, by placing the inspection device above an inspection target, the light from the light source is directed to the hologram of the inspection target through the reflection-type prism so that light rays in plural directions, reflected by the hologram, are taken into the reflection-type prism to be diffracted upward the same or substantially the same direction by the reflection-type prism, and thus, a plurality of images of the hologram can be visually observed from above the inspection device at once. Therefore, it becomes possible to positively conduct an inspection process for identifying the genuineness of an inspection target having a hologram quickly. Moreover, since the sensor and the switching unit are no longer required, the cost reduction can be achieved.

Furthermore, the light source may be placed so as to irradiate the light from the light source from one end toward the other end of the reflection-type prism in the horizontal direction, an extension portion may be provided so as to extend from the other end of the reflection-type prism in the horizontal direction, a light reflection unit may be provided on the lower face of the extension portion, and a light transmission portion may be provided at a portion of the case that corresponds to the upper face of the extension portion.

With this arrangement, since an inspection target is positioned above the extension portion, the watermark of the inspection target is also confirmed so that the inspection for identifying the genuineness of the inspection target can be conducted more positively.

The light source may be constituted from a white light-emitting diode, and the case may be provided with a battery housing unit for housing a battery that supplies power to the light-emitting diode.

With this arrangement, the inspection device may be brought to any desired place so as to conduct the inspecting process for identifying the genuineness of an inspection target.

A concave section into which the light-emitting unit of the light-emitting diode is fitted may be formed in the reflection-type prism.

With this arrangement, the positioning process of the light-emitting diode onto the reflection-type prism can be carried out without using any special member, and the light-emitting face of the light-emitting diode can be placed as close to the reflection-type prism as possible.

DESCRIPTION OF THE PREFERRED EMBODIMENTS

Referring to Figures, the following description will discuss Embodiments of the present invention. Here, explanations will be given by exemplifying a banknote inspection device as an inspection device in accordance with the present invention.

Figure 1:
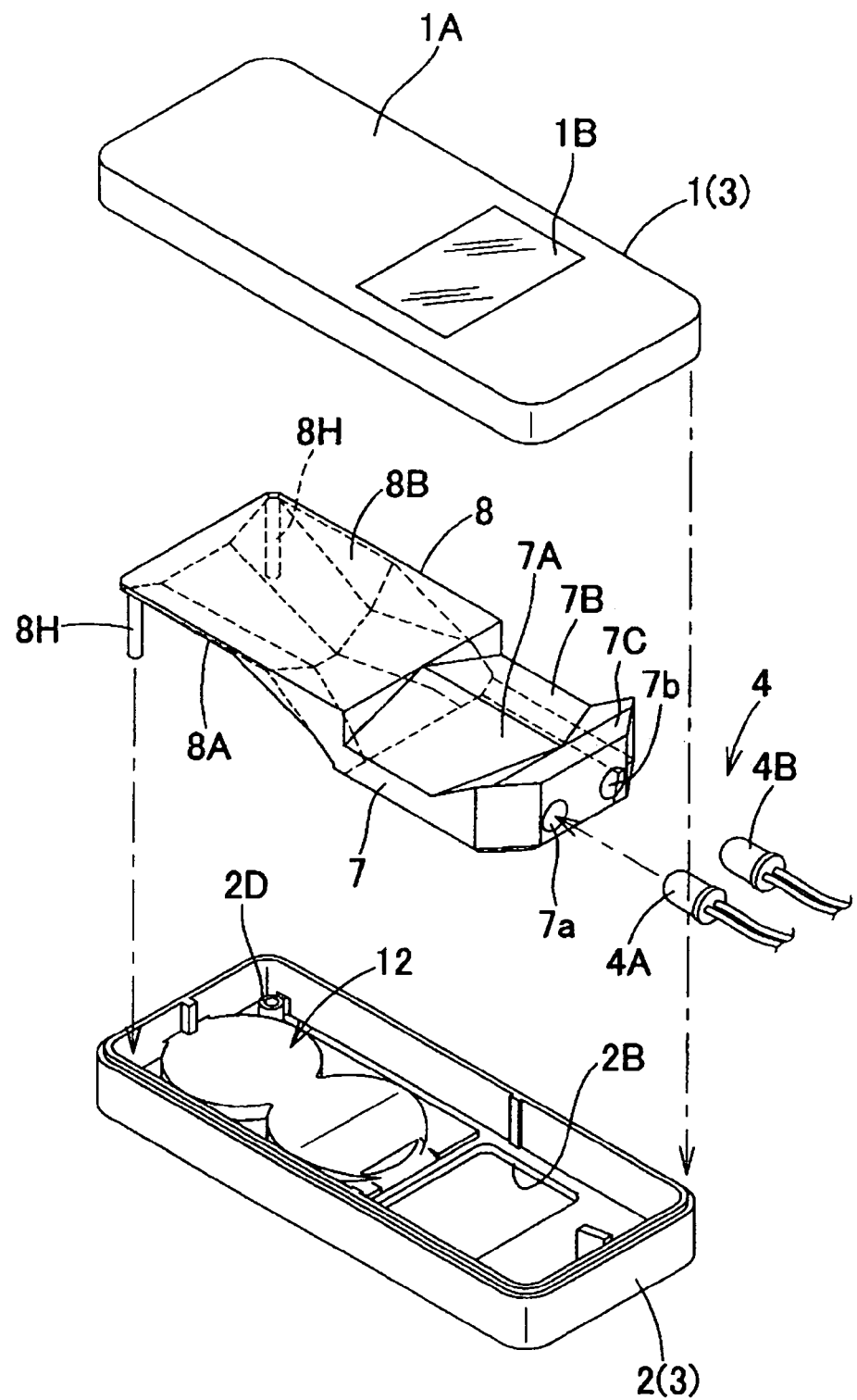
FIG. 1 is an exploded perspective view that shows a banknote inspection device.
Figure 2A:
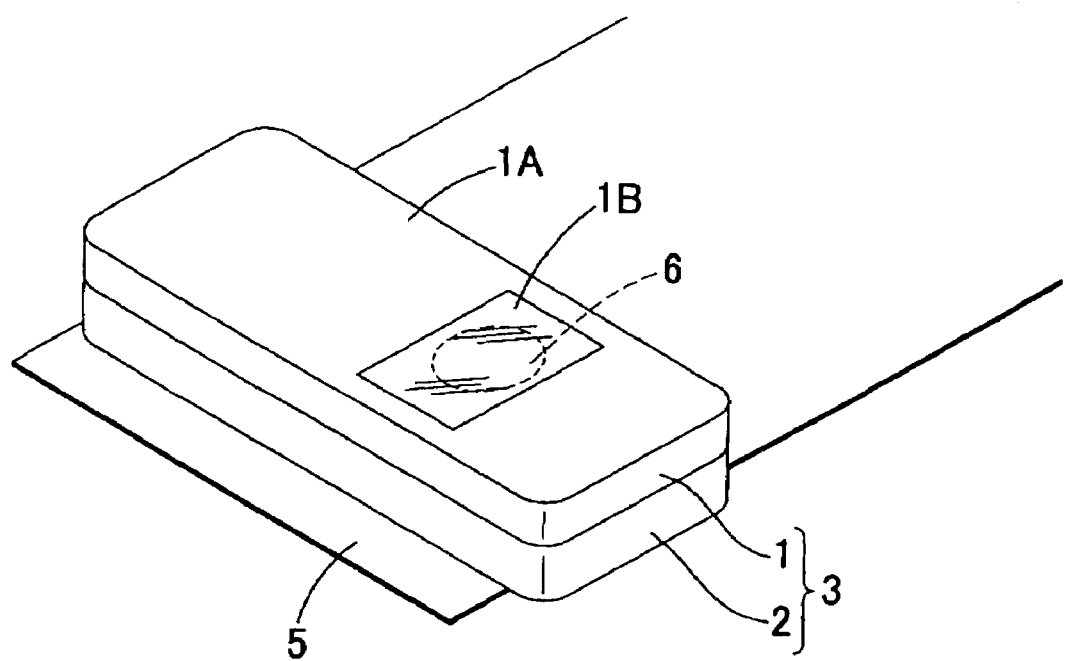
FIG. 2A is a perspective view that shows a state in which the banknote inspection device is placed on a banknote.
Figure 2B:
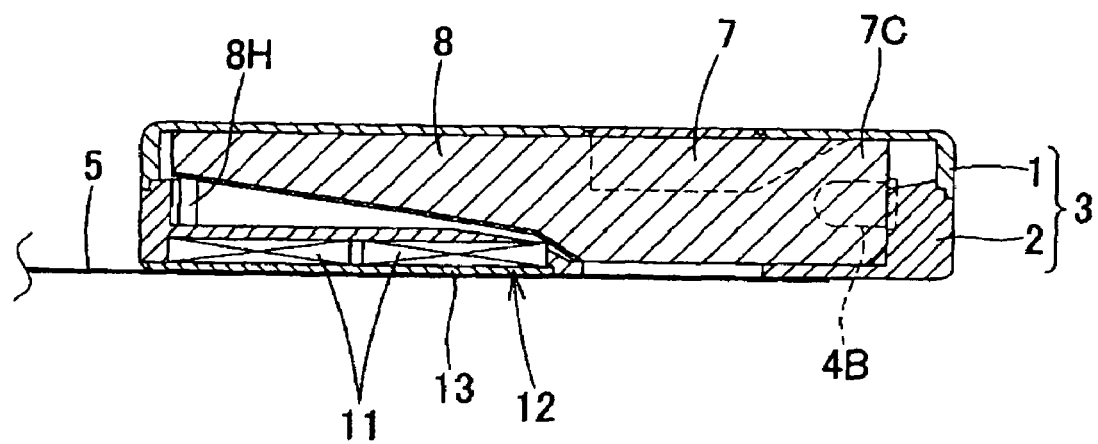
FIG. 2B is a sectional view that shows the state in which the banknote inspection device is placed on a banknote.

FIG. 1, FIG. 2A and FIG. 2B show a rectangular parallelepiped banknote inspection device used for conducting an inspection process for identifying the genuineness of a banknote. However, the inspection device of the present invention may be in any shape. This banknote inspection device is provided with, in a case 3 having upper and lower divided case portions 1 and 2, a light source 4 used for projecting light, and a reflection-type prism 7 that directs light from the light source 4 to a hologram 6 (see FIG. 5) provided for a banknote 5 disposed at a lower side, and acquires reflected light from two different directions from the hologram 6 to diffract the light upward, which is the same or substantially the same direction. In this case, only the banknote is discussed. However, the inspection target may be a card to which a hologram is attached, and any item may be used as long as it has a hologram. This banknote inspection device is provided with light transmission portions 1B and 2B that correspond to upper and lower faces of the reflection-type prism 7 of the case 3. The light transmission portion 1B on the upper face is formed by a plate member made of transparent plastic (or may be made of glass) that closes an opening formed on the upper face of the divided case portion 1 on the upper side so as to prevent dusts from entering through the opening, but this portion may be omitted when putting into practice. Moreover, although the light transmission portion 2B on the lower side is configured as an opening formed on the lower face of the divided case portion 2 on the lower side, it is possible to put into practice with a plate member attached in the same manner as the light transmission portion 1B on the upper side.

Figure 5:
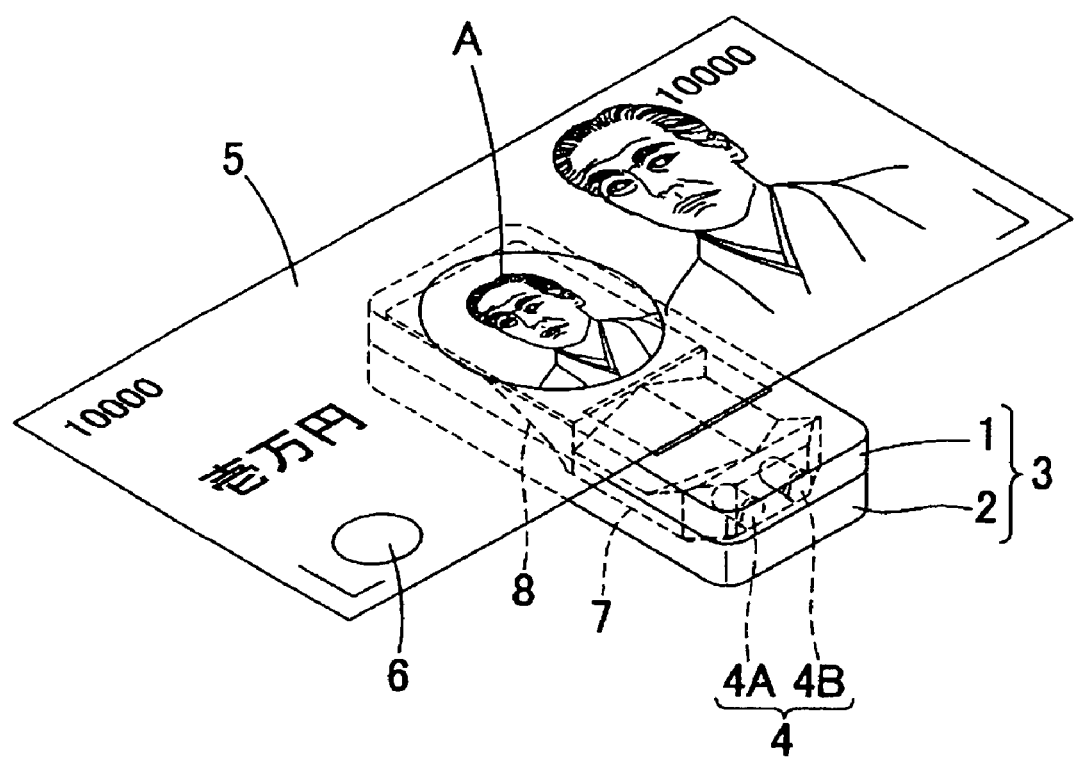
FIG. 5 is a perspective view that shows a state in which the banknote inspection device is placed on a banknote so that a watermark is visually confirmed.

As shown in FIGS. 1 and 2B, the light source 4 has a shape of a pair of bullets (may have a chip shape) that are aligned in the horizontal direction, and is constituted by white light-emitting diodes 4A and 4B, and the end portion 7C of the reflection-type prism 7 is provided with a pair of concave sections 7a and 7b to which the light-emitting portions of the light-emitting diodes 4A and 4B are fitted so that the positioning process of the light-emitting diodes 4A and 4B onto the reflection-type prism 7 is carried out by using the concave sections 7a and 7b. However, the light-emitting diodes 4A and 4B may be positioned by using another method. Moreover, the light source 4 is provided so as to be fitted into the concave sections 7a and 7b formed at one end as described above in order to project light from one end of the reflection-type prism 7 in the horizontal direction toward the other end, an extension portion 8 extending in the horizontal direction opposite to the light-emitting diodes 4A and 4B from the other end of the reflection-type prism 7 is provided, a light reflection unit 8A is formed on a lower surface of the extension portion 8 by applying a white-color paint or a silver-color paint, by vapor-depositing aluminum or the like, or by subjecting to a mirror face treatment, and a light transmission unit 1A is provided on a portion of the divided case portion 1 on the upper side corresponding to the upper face of the extension portion 8. By such a configuration, as shown in FIG. 5, a banknote inspection device is placed on the lower side of a banknote 5, and thus, light rays from the light-emitting diodes 4A and 4B are directed to the banknote 5 through the light transmission portion 1A of the divided case portion 1 on the upper side from the upper face 8B of the extension portion 8 so that it becomes possible to confirm whether or not any watermark A is present. In this case, for example, light-emitting diodes 4A and 4B, which are advantageous from the viewpoints of power consumption and durability, are adopted, but another light source, such as a small light bulb and a fluorescent lamp, may be used. Reference numerals 8H and 8H shown in FIG. 1 represent rod-shaped portions that extend downward from the lower face of the end portion of the extension portion 8, and by inserting leading ends of these into cylinder portions (engaging portions) 2D formed in the divided case portion 2 on the lower side (only one of these is shown in the Figure), the extension portion 8 is engaged and secured onto the divided case portion 2 on the lower side.

The lower face 8A of the extension portion 8 is machined so that it is gradually raised upward from one end on the reflection-type prism 7 side toward the other end (the side edge departing from the light-emitting diodes 4A and 4B); thus, the extension portion 8 is formed into a thin shape so that damping of the light rays from the light-emitting diodes 4A and 4B is made as small as possible. Moreover, the lower face 8A is constituted by a number of virtually flat faces having different angles so as to allow light to scatter easily. Here, the divided case portion 1 on the upper side is made of a white, semi-transparent material that allows light to transmit therethrough so as to make wires, etc. inside as invisible as possible, as well as scattering light from the upper face 8B of the extension portion 8 to allow the banknote to be evenly irradiated with light. However, this portion may be made of a transparent material as required.

Figure 3:
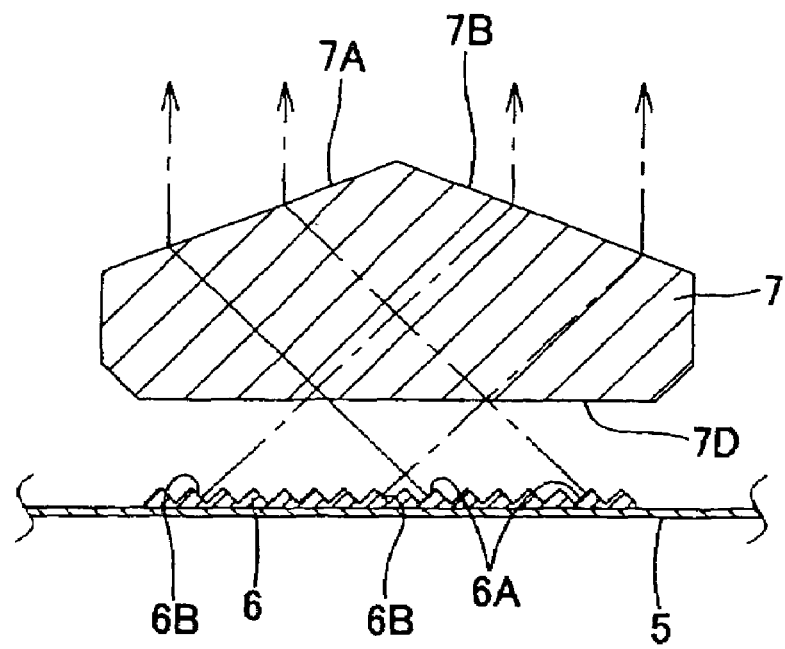
FIG. 3 is a sectional view that indicates a principle in which reflected light rays from a hologram are made incident on a reflection-type prism.
Figure 4:
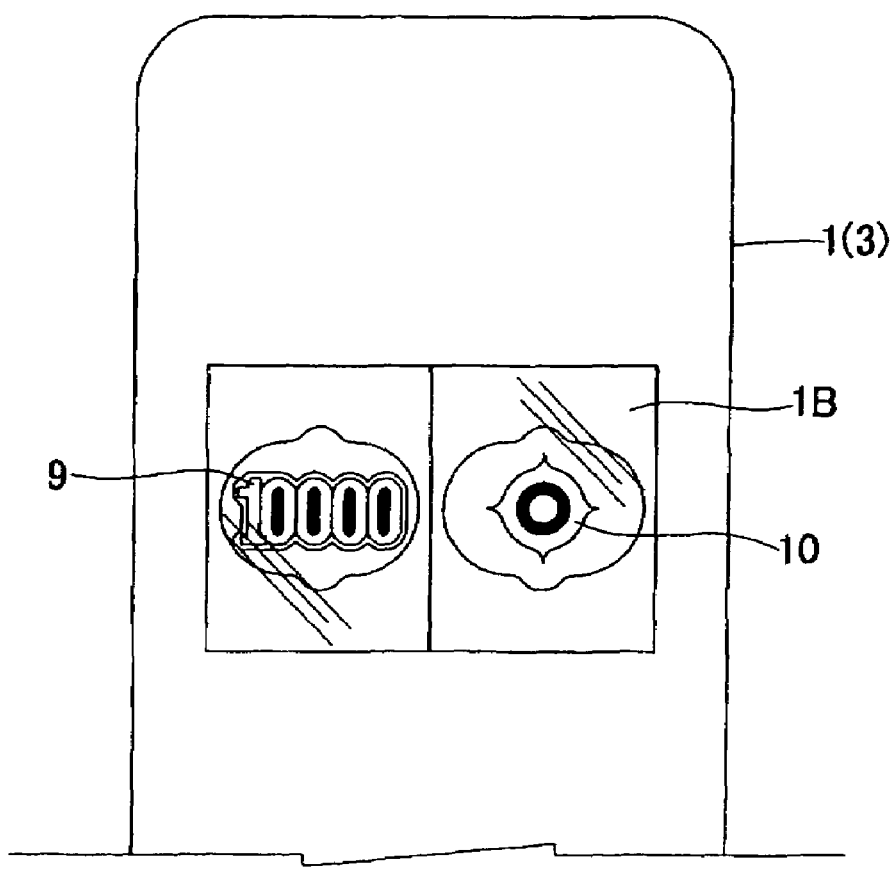
FIG. 4 is a plan view that shows a banknote inspection device in a state that allows two images of a hologram to be visually confirmed through a light transmission portion, with one portion thereof being omitted.

The reflection-type prism 7, which is made of quartz, glass or the like, has a lower face that is virtually flat and an upper face having a sectional shape with a mountain form having two slanting faces 7A and 7B (see FIG. 3). Therefore, as shown in FIG. 2A and FIG. 2B, the banknote inspection device is mounted on the upper face of a banknote 5 so that the hologram 6 of the banknote 5 is made coincident with the opening 2B of the divided case portion 2 on the lower side so as to allow the light-emitting diodes 4A and 4B to emit light. By this, as shown in FIG. 3, light rays from the light-emitting diodes 4A and 4B are directed to the hologram 6 from the lower face of the reflection-type prism 7 so that light rays reflected from the same slanting face of one of the two slanting faces having different slanting directions of the concave-convex faces formed on the hologram 6 (in which FIG. 3 indicates light reflected in a diagonally left upward direction from the left downward slanting face 6A located on the right side) and light rays reflected from the same slanting face of the other slanting faces (in which FIG. 3 indicates light reflected in a diagonally right upward direction from the right downward slanting face 6B located on the left side) are made incident on the lower face 7D of the reflection-type prism 7, and diffracted by the two slanting faces 7A and 7B so that the directions of the light rays are changed to upward directions. As a result, as shown in FIG. 4, an image 9 of "10000" on the left side and an image 10 of the Japanese "Kanji" character "日" (the first character of the word "日日本", meaning "Japan") on the right side are visually observed simultaneously through the light transmission portion 1B. The slanting angles of the slanting faces 7A and 7B are changed depending on the slanting angles of the concave-convex portions of the hologram 6.

A battery housing unit 12, which houses a battery 11, is formed on the lower face of the divided case portion 2 on the lower side that forms the case 3 in a manner so as to protrude upward. Moreover, a lid 13 that is detachably attached and closes the battery housing unit 12 housing the battery 11 is prepared. The preparation of the battery housing unit 12 makes it possible to bring the banknote inspection device to any desired place, but another example in which a power supply can be connected thereto may be put into practice. In this Embodiment, although not shown in the drawings, a switch that turns the light-emitting diodes 4A and 4B ON and OFF is provided for the banknote inspection device.

The banknote inspection device having the above-mentioned arrangement makes it possible to visually confirm two images of the hologram 6 shown in FIG. 2A, FIG. 2B and FIG. 4, and also makes it possible to visually confirm the watermark of a banknote 5 shown in FIG. 5. The banknote inspection device may also be designed so as to visually confirm only the two images of the hologram 6 by omitting the extension portion 8 therefrom. In this case, the miniaturization of the device is further realized.

In the present Embodiment, explanations have been given on the banknote inspection device in which two image of a hologram can be visually observed from the same direction. The banknote inspection device is adopted in such a manner because of a characteristic of holograms that two diffracted light rays are conspicuous. However, since the reflected light rays (diffracted light rays) from the hologram are not limited to two, the shape of the reflection-type prism may be modified so as to allow three or more images of the hologram to be visually observed from the same direction.

Moreover, in the present Embodiment, the hologram of an inspection target (banknote 5) has a structure in which interference fringes of the hologram are replaced by concave-convex portions in microns. However, the hologram of an inspection target may have a structure formed by an optical variable ink (OVI) that varies its color depending on the viewing angle due to the effect of interference of light.

What is claimed is:
1. An inspection device comprising:
a light source used for irradiating light;
a reflection-type prism that irradiates the light from the light source to a hologram provided on an inspection target that is placed downward, and diffracts light rays in different directions that are reflected from the hologram upward in the same or substantially the same direction; and
a case that houses the light source and the reflection-type prism, wherein
the light source is placed so as to irradiate the light from the light source from one end toward the other end of the reflection-type prism in the horizontal direction,
an extension portion is provided so as to extend from the other end of the reflection-type prism in the horizontal direction,
a light reflection unit is provided on the lower face of the extension portion, and
a light transmission portion is provided at a portion of the case that corresponds to the upper face of the extension portion.
2. The inspection device according to claim 1, wherein
the light source is constituted from a white light-emitting diode, and
the case is provided with a battery housing unit for housing a battery that supplies power to the light-emitting diode.
3. The inspection device according to claim 2, wherein
a concave section into which the light-emitting unit of the light-emitting diode is fitted is formed in the reflection-type prism.

* * * * *